(12) United States Patent
Perez Lafuente

(10) Patent No.: US 9,042,910 B2
(45) Date of Patent: *May 26, 2015

(54) METHOD AND SYSTEM FOR MONITORING A MOBILE STATION PRESENCE IN A SPECIAL AREA

(71) Applicant: AFIRMA CONSULTING & TECHNOLOGIES, S.L., Madrid (ES)

(72) Inventor: Carlos A. Perez Lafuente, Madrid (ES)

(73) Assignee: AFIRMA CONSULTING & TECHNOLOGIES, S.L., Madrid (ES)

(*) Notice: Subject to any disclaimer, the term of this patent is extended or adjusted under 35 U.S.C. 154(b) by 0 days.

This patent is subject to a terminal disclaimer.

(21) Appl. No.: 14/250,517

(22) Filed: Apr. 11, 2014

(65) Prior Publication Data

US 2014/0221007 A1 Aug. 7, 2014
US 2015/0080015 A2 Mar. 19, 2015

Related U.S. Application Data

(63) Continuation of application No. 12/294,641, filed as application No. PCT/EP2007/052939 on Mar. 27, 2007, now Pat. No. 8,738,040.

(30) Foreign Application Priority Data

Mar. 28, 2006 (EP) ................................ 06111804

(51) Int. Cl.
H04W 4/02 (2009.01)

(52) U.S. Cl.
CPC ........................ *H04W 4/02* (2013.01)

(58) Field of Classification Search
CPC .................................................. H04W 4/02
USPC ........ 455/456.1, 456.4, 432.2, 433, 406, 458, 455/414.1, 446

See application file for complete search history.

(56) References Cited

U.S. PATENT DOCUMENTS 6,334,052 B1 * 12/2001 Nordstrand .................... 455/411
6,516,190 B1 * 2/2003 Linkola ........................ 455/408
(Continued)

FOREIGN PATENT DOCUMENTS

WO WO-0103372 A1 1/2001

OTHER PUBLICATIONS

International Search Report issued in PCT/EP2007/052939 dated Jun. 21, 2007.

*Primary Examiner* — Jinsong Hu
*Assistant Examiner* — Jean Chang
(74) *Attorney, Agent, or Firm* — Venable LLP; Jeffri A. Kaminski; David M. Klecyngier

(57) ABSTRACT

Method for monitoring the presence of a mobile station in at least one special area, wherein a radio communication defining device transmits one radio distinctive defining signal that define the special area by its coverage, the mobile station processes a signal received in order to determine whether or not it is defining signal and more precisely a distinctive one that defines the special area, the mobile station sends an updating signal to a mobile telephone network, the network routes the updating signal to special operating means that adapt the value of an operating parameter. According to the invention, the special area is associated to the mobile station by transmitting to the mobile station a checking data used by the mobile station for determining whether or not the defining signal received is distinctive defining signal.

14 Claims, 7 Drawing Sheets

(56) References Cited

U.S. PATENT DOCUMENTS

| | | | |
|---|---|---|---|
| 6,516,193 B1 * | 2/2003 | Salmela et al. | 455/432.3 |
| 6,625,442 B1 * | 9/2003 | Kojima | 455/414.1 |
| 6,671,506 B1 * | 12/2003 | Lee | 455/406 |
| 6,785,536 B1 * | 8/2004 | Lee et al. | 455/408 |
| 6,826,414 B1 * | 11/2004 | Reynolds et al. | 455/555 |
| 6,836,653 B1 * | 12/2004 | Kang | 455/408 |
| 6,920,317 B1 * | 7/2005 | Muhonen | 455/405 |
| 7,142,869 B2 * | 11/2006 | Juppi et al. | 455/456.1 |
| 7,171,189 B2 * | 1/2007 | Bianconi et al. | 455/408 |
| 7,266,366 B2 * | 9/2007 | Kall | 455/414.1 |
| 7,634,255 B2 * | 12/2009 | Ko et al. | 455/414.1 |
| 7,778,652 B2 * | 8/2010 | Srey et al. | 455/458 |
| 8,723,664 B2 | 5/2014 | Rezvani et al. | |
| 2002/0094801 A1 * | 7/2002 | Atorf | 455/406 |
| 2003/0092450 A1 * | 5/2003 | Juppi et al. | 455/456 |
| 2004/0192267 A1 * | 9/2004 | Kettunen et al. | 455/414.1 |
| 2004/0224682 A1 * | 11/2004 | Kang | 455/433 |
| 2005/0075124 A1 * | 4/2005 | Willenegger et al. | 455/522 |
| 2005/0148297 A1 * | 7/2005 | Lu et al. | 455/3.06 |
| 2008/0004045 A1 * | 1/2008 | Srey et al. | 455/458 |
| 2008/0261604 A1 * | 10/2008 | Ritter | 455/446 |
| 2010/0167725 A1 * | 7/2010 | Noldus et al. | 455/433 |

\* cited by examiner

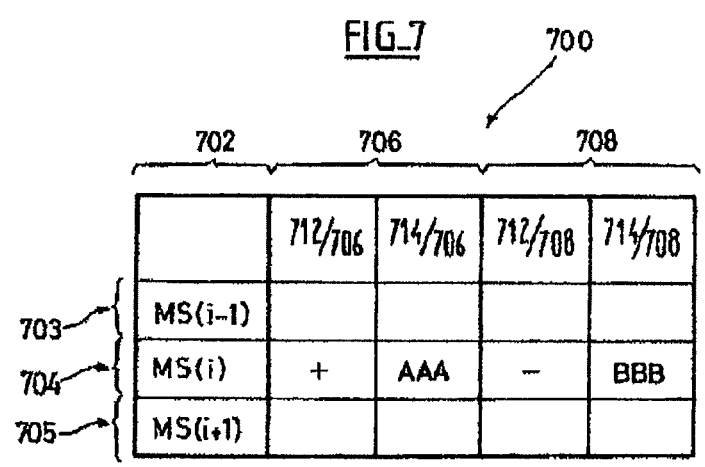
FIG_7

METHOD AND SYSTEM FOR MONITORING A MOBILE STATION PRESENCE IN A SPECIAL AREA

CROSS-REFERENCE TO RELATED APPLICATIONS

This application is a continuation of U.S. National Phase application Ser. No. 12/294,641, filed Apr. 12, 2010 which claims priority to International Application No. PCT/EP2007/052939 filed Mar. 27, 2007 which claims benefit of the European Patent Application No. 06111804.8 filed Mar. 28, 2006 each of which is hereby incorporated herein by reference in their entireties.

BACKGROUND ART

This invention relates to a method for monitoring a mobile station presence in a special area. This invention relates also to a mobile system, a server, a radio transmitting device, and a mobile station suitable for carrying out such a method.

Development of short range wireless communication solutions based on the use of Bluetooth, DECT and WIFI within a small area such as homes is strong competition for mobile operators owning wide mobile networks. A mobile telephone network (called also mobile network) includes a large number of base stations and all the data processing means required to provide the telecommunication service to each mobile station serviced by said mobile network.

These short range wireless communication solutions can provide direct connection to fixed networks whose operators offer cheaper rates than those offered by mobile networks. It can therefore be of interest for mobile network operators to offer different rates depending on the instantaneous location of a mobile station connected to its mobile network, in particular in areas; called special areas, where it could face strong competition from some short range wireless communication solutions.

The published patent application no US20020094801 describes a technical solution: a fixed station sends an encoded first signal and the coverage of said first signal defines a special area. The fixed station and a mobile station using the special area are linked one another via the signal code. But this document does not disclose anything about the content of said coded signal. In order to realize protection against the abuse of the system, in an embodiment, this document proposes to provide the fixed station with receiving and comparison means for an access code that is to be applied to the fixed station via the mobile station in order to put the fixed station into operation.

The international application WO 00/27152 offers another solution for locating a mobile station based on the use of a guide unit that broadcasts a short range radio signal which defines a home area. This document discloses that the short range radio signal contains the identity code of said mobile station that has to identify its own identity code in order to notice to a mobile switching centre that it is located in its home area. This mobile station transmits then a home message to the mobile network, this home message being possibly used notably for defining the price/service connected to telephone calls. In this last, technical solution, the guideunit has to know the identity of the mobile station and this last solution is thought to be used for a home special area.

However, this last technical solution does not allow the mobile network, to add for a mobile station one or more special areas wherein the presence of a mobile station is monitored without having to at least modify one or more guide units broadcasting in such areas. It lacks therefore of flexibility.

DISCLOSURE OF THE INVENTION

An object of the invention is therefore to provide a method for monitoring the presence of a mobile station in at least one special area, said method providing the flexibility to the mobile telephone network of associating new special areas for this mobile station in a secure way without modifying any radio transmitting device.

This object is achieved in accordance with claim 1 by providing a method for monitoring the presence of a mobile station in at least one special area associated to the mobile station, the method comprising the following steps:

a. at least one radio communication defining device transmits repeatedly in at least a channel one radio distinctive defining signal that defines the special area by its coverage b. the mobile station observes the channel and process any signal received in order to determine whether or not it is receiving any defining signal, c. the mobile station processes any defining signal received in order to determine whether or not the defining signal received is a distinctive defining signal that defines the special area, d. the mobile station sends an updating signal to a mobile telephone network about its presence in the special area, e. the mobile telephone network routes the updating signal to special operating means that adapt the value of at least one operating parameter depending on the presence of the mobile station in the special area, the said method is characterized in that the special area is associated to the mobile station by transmitting to the mobile station a checking data, this checking data being used by the mobile station for determining whether or not the defining signal received is a distinctive defining signal that defines, alone or with other distinctive defining signals, the special area associated to the mobile station and the same checking data being sent to any mobile station whose presence in this special area is monitored.

Advantageously from the operator's point of view, the invention brings the flexibility needed to activate a special way of operating a mobile station in a special area by transmitting a checking data that will be stored in a mobile station database without having to modify, by way of introducing any new data (notably the identity code of said mobile station), at least one radio communication defining device like in the aforementioned international patent application WO 00/27152. Therefore, a radio communication defining device is not required to store all the mobile stations identity codes using the special area defined by at least the coverage of its defining signal(s).

According to the present invention, a special area associated to a mobile station can be defined by one or more defining signals. Therefore the checking data may preferably contain information included in every defining signals defining completely a special area (each one defines it partially) and the mobile station try to find any of this information in any defining signal received with comparison means. The mobile station may receive defining signals that do not define any special area for it. In the case where the special area is defined by two or more defining signals, this special area may be the intersection of all or part of them or the global coverage of the defining signals.

In addition, a method according to the invention is specially suitable to be used in environments like for example airports, company's premises or business centres where the number of different mobile stations to be serviced by the mobile telephone network would be high. With the solution of the aforementioned international patent application WO 00/27152, it would be necessary to store and transmit in and from a single radio communication defining device all the mobile station identity codes of the potential mobile stations using a special area defined in such environment, operation which would difficult or even impossible considering that the radio spectrum is a limited resource. Therefore, the application WO 00/27152 has a narrower geographical scope of usability. It is also not required, thanks to the invention, to send any activation code to activate a radio communication defining device and it is not required to store all the mobile stations activation codes in the radio communication defining device, as in one embodiment of the published patent application n2US20020094801. Therefore, it is easier with this present invention to realize protection against abuse of the system.

The special operating means may be at least partly included in the data processing means of the mobile telephone network. All of them or part of them may be own or operate by an external provider of the mobile telephone network.

In a particular embodiment, the special area is deactivated for the mobile station by the mobile telephone network sending a deactivation signal to the mobile station to stop the mobile station from recognizing a defining signal that defines that special area as a distinctive one.

In a particular embodiment, the special operating means acknowledge the reception of the updating signal and transmit an acknowledgement signal to the mobile station. In this embodiment, the mobile station knows advantageously if the mobile telephone network received the updating signal or not.

In a particular embodiment, at least one radio communication defining device is a wireless device whose radio defining signal that defines the special area is distinctive wireless signal transmitted by the wireless device in a frequency range outside the frequency range allocated for the mobile telephone network. Preferably, the said distinctive wireless signal contains wireless device identification data and reliable information confirming that the wireless device is effectively located into a predetermined environment. The operator of the mobile telephone network advantageously avoids fraud linked to a possible shifting of the wireless device. The checking data associated to this wireless device includes this wireless device identification data.

In another particular embodiment, at least one radio communication defining device is a base station whose radio distinctive defining signal that defines the special area is a distinctive signal comprising a special mobile telephone network identification code, the checking data associated to this base station includes this special mobile telephone network identification code.

In another particular embodiment, at least one radio communication defining device is a base station whose radio distinctive defining signal that defines the special area is a distinctive base station identity signal comprising an identification code of the base station, the checking data associated to this base station includes this base station identification code. The mobile telephone network operator controls and knows the location of all the base stations broadcasting identification codes contained into the mobile station database and therefore advantageously controls the location of the special area.

In an embodiment of this invention, the special operating means store a parameters database linking the special area to the mobile station and to a set of at least the operating parameter; and the special operating means adapt the value of at least an operational parameter of this set when they receive an updating signal signalling that the mobile station exits or enters the special area. Thanks to this embodiment of the invention, the processing of these operating parameters is centralized in the special operating means and it is not done in each base station. In case the mobile station will be switch off, the mobile network operator will decide whether or not the values of the operating parameters associated to the presence of the mobile station into special operating areas remain unchanged or are disabled into the database containing the set of operating parameters as consequence of the switching off process.

In a particular embodiment, the operating parameter is a tariff or a service flag that enables or disables a special tariff or a service for the mobile station. Advantageously, the operator's services offer can therefore being dependent on the location of the mobile station.

In a particular embodiment, the updating signal includes a request to access to a service or to a multimedia content and the mobile telephone network routes this request to a part of the special operating means that allow or forbid the provision of this service or multimedia content depending on whether or not the mobile station is into the special area. This part of the special operating means may be operated by the mobile telephone network operator or by a different provider.

In a particular embodiment, the transmission of the checking data to the mobile station is done via the mobile telephone network or via a signal of at least one radio device or via a person introducing the checking data in the mobile station.

According to the present invention, there is further provided a mobile system for monitoring the presence of a mobile station in a special area defined for this mobile station, said system comprising:

checking means for detecting the presence of the mobile station in the special area associated to this mobile station, said checking means including At least one radio communication defining device transmitting repeatedly in at least a channel a radio distinctive defining signal that defines the special area, in the mobile station, observing means for observing the channel and processing means for processing any signal received in the channel in order to determine whether or not the signal received is a defining signal and, if the signal received is a defining signal, whether or not the signal received is a distinctive defining signal that defines the special area, transmission means for sending an updating signal regarding the presence of the mobile station in the special area from the processing means to special operating means included at least partly in data processing means of the mobile telephone network, the special operating means for adapting the value of at least one operating parameter depending on the presence of the mobile station in the special area, characterized in that the said mobile system comprises storing means for storing a checking data in the mobile station, the processing means include means for using this checking data for determining whether or not the defining signal received is a distinctive defining signal that defines, alone or with other distinctive defining signals, the special area and the same checking data is sent to any mobile station whose presence in this special area is monitored.

In a particular embodiment of the invention, the mobile system comprises special area location monitoring means for monitoring the correct location of at least a part of the special area. It is then harder to fraud by moving the radio communication defining device. In a particular embodiment of the invention, the mobile system carries out a method according to the present invention.

This invention also concerns a server. According to the invention, this server is characterized in that it contains at least some of the special operating means included in the mobile system according to the present invention. This server may contain the whole or part of the special operating means. In this last case, the special operating means may be spread in several servers or computers.

According to the present invention, there is further provided a radio communication defining device, characterized in that it carries out a method according to the present invention. In a particular embodiment, the said radio communication defining device of the invention is a wireless device and it contains means for transmitting the distinctive wireless signal that defines the special area and means for obtaining reliable information indicating whether or not the said wireless device is located into a predetermined environment.

This invention also concerns a mobile station, characterized in that this mobile station is suitable to carry out a method according to the present invention. This mobile station may be a mobile telephone or a Personal Digital Assistant for example.

BRIEF DESCRIPTION OF THE DRAWINGS

In the following detailed description of some possible embodiments, other features and advantages of the invention will appear, each description being made with reference to the following drawings:

FIG. 7 is a schematic diagram of a part of another operating parameters database in an embodiment of the invention.

DETAILED DESCRIPTION

A mobile station serviced by the mobile telephone network. The mobile telephone network may be cellular or not.

In this description and in the claims, it is supposed, in the case that the mobile telephone network is cellular, that each base station of the cellular mobile telephone network is associated to a unique cell. Therefore, some base stations of the cellular mobile network can be located in the same location and share technical means. For example, a tower may incorporate three sets of antennas, each set being part of a different base station of the same mobile network.

Figure 1:
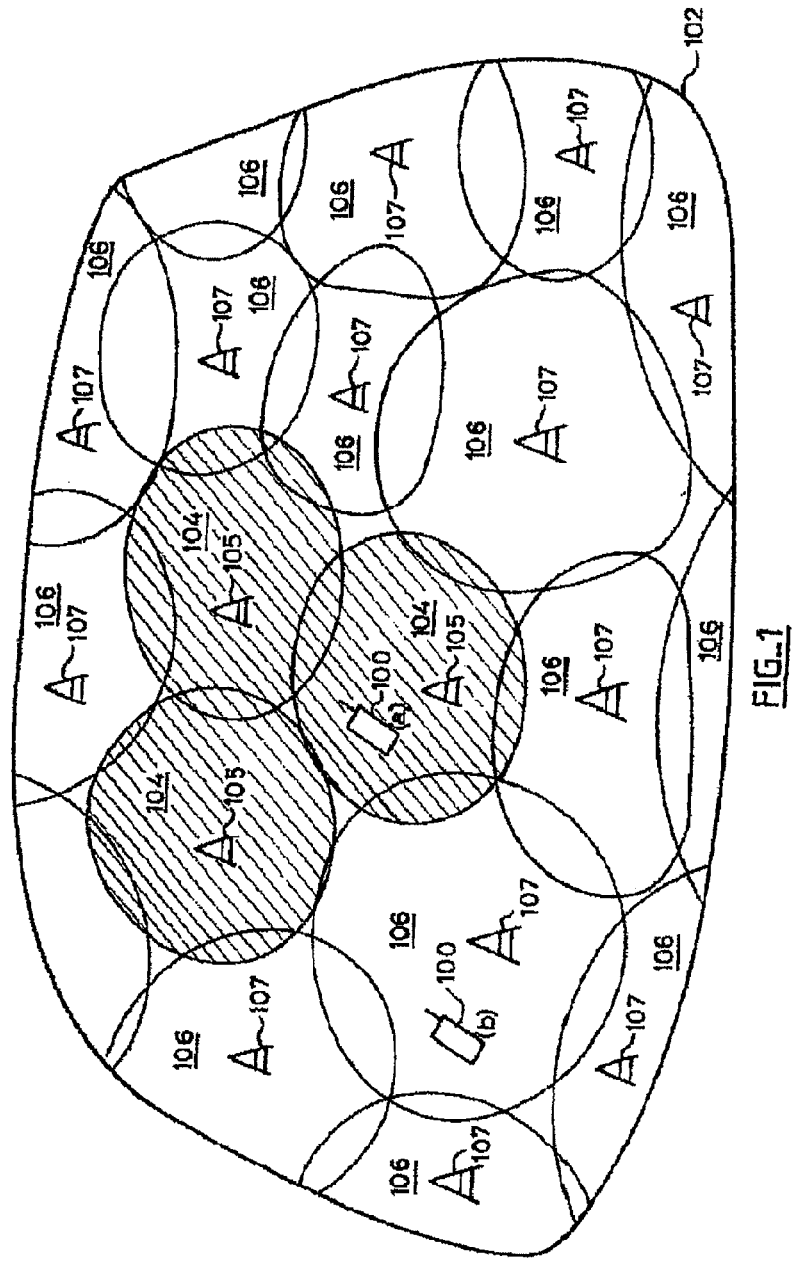
FIG. 1 is a schematic diagram illustrating an embodiment of a mobile system according to the invention.
Figure 2:
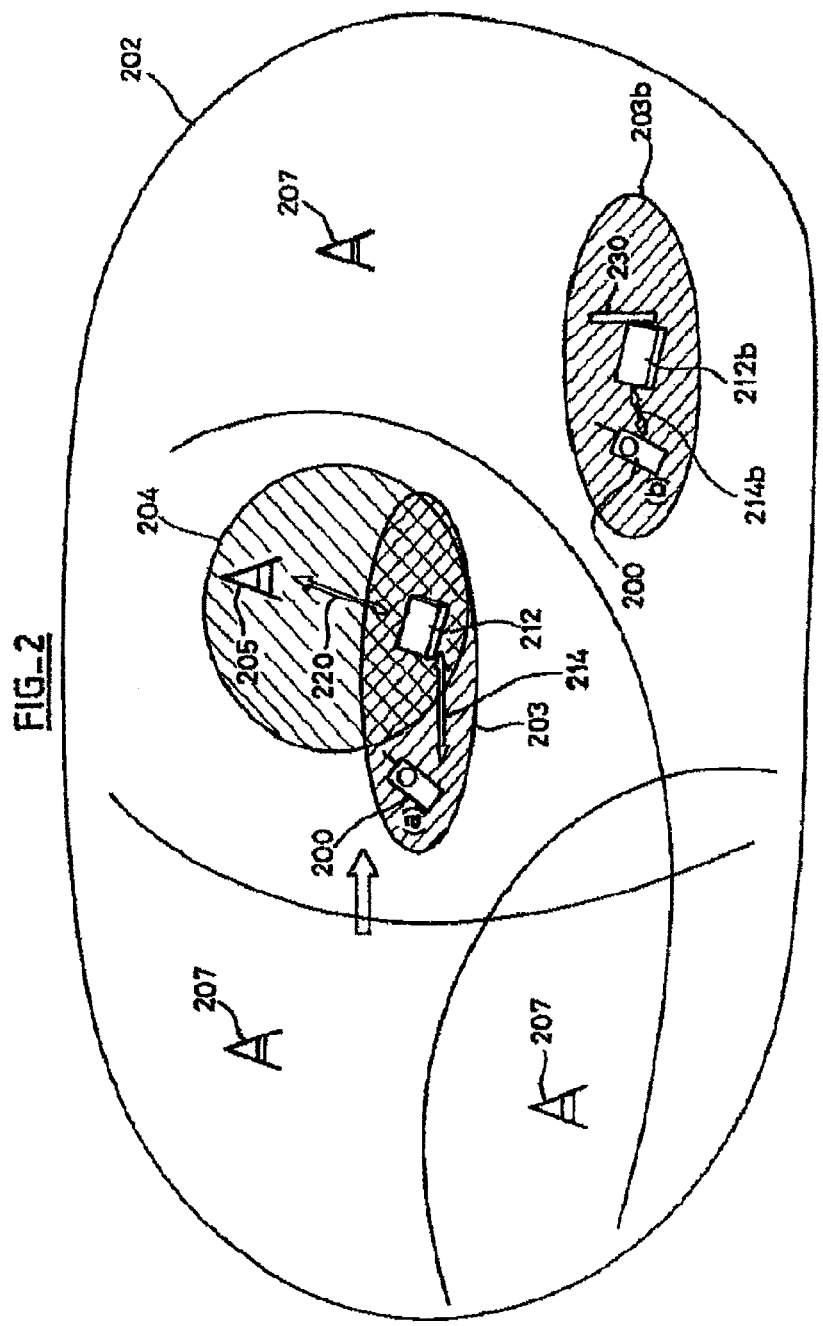
FIG. 2 is a schematic diagram illustrating another embodiment of a mobile system according to the invention.
Figure 3:
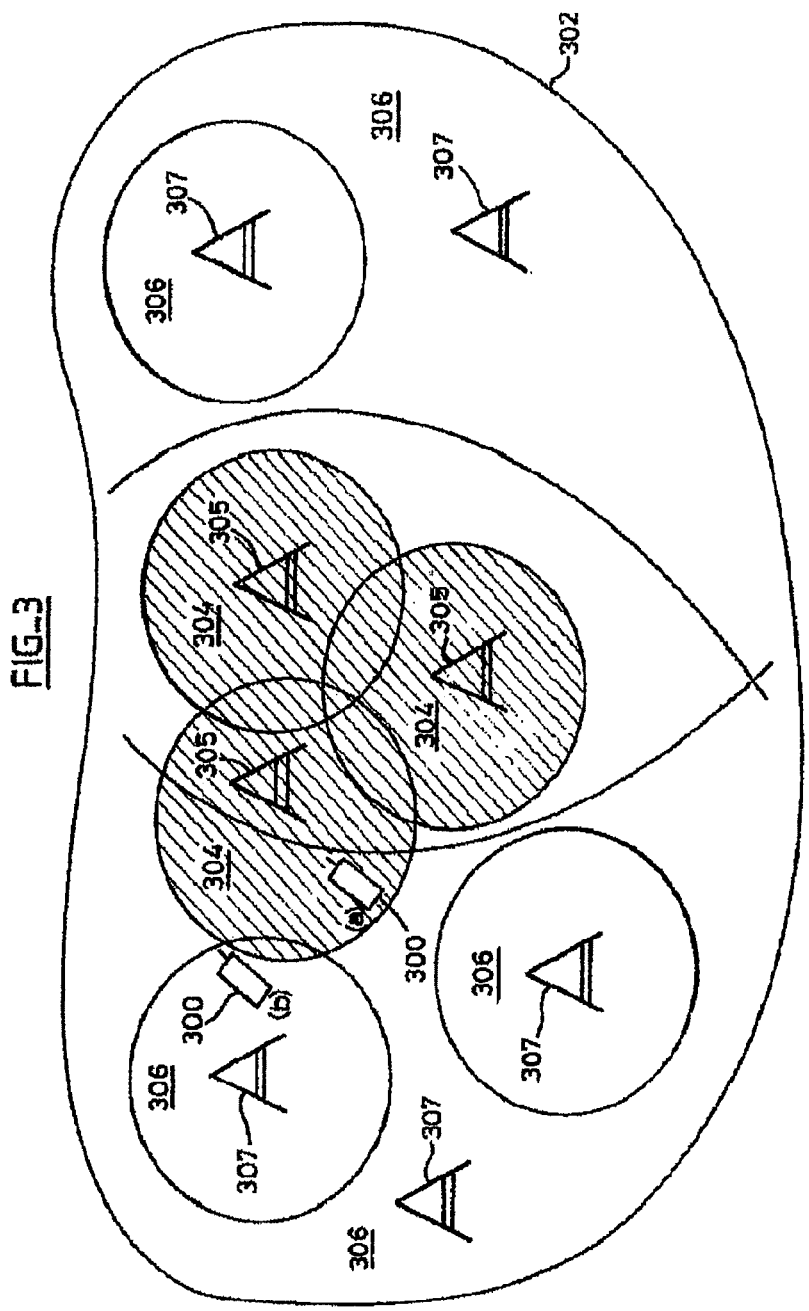
FIG. 3 is a schematic diagram illustrating another embodiment of a mobile system according to the invention.

FIG. 1, FIG. 2 and FIG. 3 are three schematic figures describing three particular embodiments of mobile systems according to the invention.

FIG. 1 is a schematic diagram illustrating an embodiment of the invention wherein:

any base station 107 or 105 of a mobile telephone network of an operator is a radio communication defining device transmitting a radio defining signal in a channel used by the mobile telephone network, the distinctive radio defining signal that defines the special area is a distinctive signal transmitted by some selected base stations 105, said distinctive signal comprising a special mobile telephone network identification code. The sum of the coverage of these selected base stations 105 defines a special area (the shaded area of FIG. 1).

the checking data includes this special mobile telephone network identification code.

More precisely, FIG. 1 shows a geographical area 102 covered by the mobile telephone network. The radio coverage of the mobile telephone network in this geographical area 102 is the addition of the radio coverage 104 and 106 of several base stations 105 and 107. The mobile telephone network includes data-processing means that comprise a server according to the invention including special operating means according to the invention.

Each base station is transmitting network data, including a mobile telephone network identification code, which allows a mobile station 100 in the geographical area 102 to select the appropriate mobile telephone network.

The operator of the mobile telephone network defines one special mobile telephone network identification code, called IC2, (in another embodiment, the operator may create more than one special mobile telephone network identification code) different from a normal mobile telephone network identification code, called IC1. Then the operator configures its mobile telephone network in such a way that some base stations 107 (in general the majority of them) transmit a radio defining signal comprising the normal mobile telephone network identification code and the selected base stations 105 (in general a minority of them) transmit a distinctive defining signal comprising a special mobile telephone network identification code.

The checking data (i.e. IC2) is stored into an internal mobile station database included in mobile station 100 storing means, this mobile station 100 being associated to this special area. The same checking data is sent to any mobile station whose presence in this special area is monitored.

The mobile station 100 contains observing means and processing means for determining that the distinctive defining signal transmitted by any base station 105 is received. These processing means include means for using the checking data that include, in this embodiment, comparing means: Thanks to these comparing means, the mobile telephone network identification codes received by the mobile station are compared to IC2 stored into the internal mobile station database: If the mobile station is in a position like the position (a) in FIG. 1, i.e. inside the special area, the mobile telephone network identification code received is equal to IC2 and therefore the mobile station 100 determines that it is into the special area. Otherwise, if the mobile station 100 is in position like the position (b) in FIG. 1, i.e. outside the special area, the mobile station 100 receives a defining signal containing 101 different from IC2 and determines that it is not receiving any distinctive defining signal and therefore that it is not into the special area.

For example, if the mobile station 100 is a GSM mobile station operating into a GSM mobile telephone network, the mobile station 100 has the capability to store the received mobile telephone networks identification codes into a mobile station 100 memory. In that case, the mobile station 100 may access to such internal memory to get data to determine, together with the checking data (i.e. IC2), whether or not it is receiving any distinctive defining signal.

With the exception of the processes concerning the invention, a special mobile telephone network identification code (IC2) is equivalent, from the perspective of both the mobile station and the mobile telephone network, to a normal mobile telephone network identification code (IC1). In this context, processes such as network selection, selection/reselection of base stations and handover will not be influenced because some base stations transmit IC1 and some other transmit IC2, such lack of influence meaning that all the mobile station and the mobile telephone network processes (except the processes concerning the invention) will be handle as if IC1 and IC2 would be the same code.

For example, a mobile telephone network operator can use this embodiment of the invention to offer one set of normal billing rates in-an urban environment of a country, and another set of special billing rates for a rural environment. Another example of the application of this embodiment of the invention is for a mobile telephone network operator to offer normal billing rates for the whole country except in industrial areas or business districts.

FIG. 2 is a schematic diagram illustrating an example of another embodiment of a mobile system according to the invention wherein the radio communication defining device is a wireless device (212 or 212b), e.g. a WIFI, Bluetooth or DECT device, the radio distinctive defining signal that defines the special area is a distinctive wireless signal 214 or 214b (e.g. a WIFI, Bluetooth or DECT signal) transmitted by the wireless device (212 or 212b) in a frequency range outside the frequency range allocated for the mobile telephone network. A mobile station 200 whose presence in the special area is monitored includes observing means and processing means for determining whether or not any defining signal is received in the frequency range used by the wireless device.

Each distinctive wireless signal contains wireless device identification data and reliable information confirming that its transmitting wireless device (212 or 212b in FIG. 2) is effectively located into a predetermined environment. The checking data comprises a set of at least one wireless device identification data.

The predetermined environment may be one or more specific geographical locations (for example several fixed points into a restaurant) or a physical environment that can be mobile (for example a car, a plane or a boat). The predetermined environment is defined by the operator of the mobile telephone network.

The distinctive wireless signals are preferably coded and the mobile station 15 processing means include decoding means to decode the wireless signals received.

The mobile system comprises special area location monitoring means for monitoring the correct location of any wireless device that may transmit a distinctive wireless signal into this predetermined environment and therefore for monitoring at least a part of the special area.

In a particular embodiment of the special area location monitoring means, the reliable information comprised into the wireless signal confirms that the wireless device is effectively located into a predetermined geographical environment defined by the operator of the mobile telephone network when:

the wireless device able to receive a RBU signal from at least one radio broadcasting unit (RBU)

RBU identification data is comprised into the RBU signal, the wireless device receives, through the RBU signal from the RBU, the RBU identification data that are included into a RBU identification database of the wireless device.

The storage of the RBU identification data into the wireless device RBU identification data database may be done at the Wireless device configuration stage. In the particular example of FIG. 2 and the wireless device 212, the RBU is a base station 205 of the mobile telephone network, the RBU identification data is a base station identification code. The wireless device 212 is authenticated into the mobile telephone network comprising the base station 205 and may receive the base station signal 220 when it is located within the range of coverage 204 of the base station 205.

In a second example of embodiment of the special area location monitoring means, the reliable information comprised into the wireless signal confirms that the wireless device is effectively located into a predetermined geographical environment defined by the operator of the mobile telephone network when it is physically connected to any fixed network connection points defined by the operator of the mobile telephone network for the special area and it is also authenticated into the said fixed network through any of the mentioned fixed network connection points. In this embodiment, the wireless device also comprises means for communicating with the fixed network. In a particular example of this embodiment, some parameters are stored into the wireless device during its configuration stage and such parameters are used by the wireless device to perform the said authentication process into the fixed network.

These connection points may be PSTN ('Public Switching Telephony Network') connectors for ADSL network services or electrical sockets for PLC ('Power Line Communication') home network services for example: In the particular example of FIG. 2 and the wireless device 212b, the wireless device 212b has to be connected to a connection point 230 of a fixed network and authenticated in this fixed network so that the reliable information comprised into the wireless signal 214b confirms that the wireless device is effectively located into a predetermined geographical environment.

In the third example of an embodiment of the special area location monitoring means (not illustrated in FIG. 2), the reliable information comprised into the wireless signal confirms that the wireless device is effectively located into a predetermined physical environment defined by the operator of the mobile telephone network when:

the wireless device is physically connected to a system registered and authorised by the mobile telephone network operator for the purposes of the invention and the wireless device is authenticated into the mentioned system.

In a particular example of this embodiment some parameters are stored into the wireless device during its configuration stage and such parameters are used by the wireless device to perform the referred authentication process into the system. This system may be, in an example, embedded in a mobile device such as a car or a boat.

More precisely, FIG. 2 shows a geographical area 202 covered by a mobile telephone network of an operator, the radio coverage of the mobile telephone network in this geographical area 202 being the addition of the radio coverage of several base stations 205 and 207. The mobile telephone network includes a server according to the invention comprising special operating means. In this embodiment, a wireless device 212 is located in a geographical environment agreed between the operator and the user, such as for example near to the user's house or near his/her work place. The wireless device 212b is located either into a geographical environment, such as for example the user's home, or into a physical environment, which may be mobile, such as for example the user's car, such environments being agreed between the operator and the user.

The checking data associated to a special area is stored into an internal mobile station database included in a memory (storing means) of a mobile station 200 associated to this special area.

Processing means comprised in the mobile station 200 compare any wireless device identification data received with the checking data stored in its internal mobile station database and determines that a wireless signal received is a distinctive wireless signal when:

such wireless signal is coded in a format predefined for a distinctive wireless signal and the wireless device identification data comprised into the wireless signal is equal to at least one of the wireless device identification data stored into the internal mobile station database and the reliable information comprised into the wireless signal confirms that the wireless device is effectively located into a predetermined environment.

Otherwise the mobile station 200 determines that the wireless signal received is not a distinctive wireless signal.

In the embodiment illustrated by the FIG. 2, the sum of the coverage (203,203*b*) of the wireless devices 212 and 212*b* transmitting distinctive wireless signals 214 and 214*b* defines a special area for the mobile station 200 according to the invention.

Transmission means for sending an updating signal regarding the presence of the mobile station 200 in the special area (203, 203*b*) from the processing means to the special operating means are partly comprised in the mobile station 200 and in the mobile telephone network. The updating signal may comprise the result of the last determination performed by the mobile station about its presence into the special area. In another embodiment, the reliable information related to whether or not the wireless device 212 or 212*b* is or not effectively located into its predetermined environment is also included into the updating signal.

In this embodiment, an operator of a mobile telephone network covering a geographical area 202 may offer cheaper rates, called special billing rates, to the user of a mobile station 200 if he uses his/her mobile station 200 within the range of coverage 203 of the wireless device 212 (position (a) of the mobile station 200) or within the range of coverage 203*b* of the wireless device 212*b* (position (b) of the mobile station 200).

As an example, a mobile telephone network operator can use this embodiment of the invention to offer one set of special billing rates in premises associated to the user of the mobile station 200 as may be houses, cars or boats, and another set of normal billing rates for the rest of the environments where the user may use the mobile station 200. Another example of the application of this embodiment of the invention is for a mobile telephone network operator to offer normal billing rates for the whole country except in industrial areas, airports or restaurants.

FIG. 3 is a schematic diagram illustrating an example of another embodiment of a mobile system according to the invention wherein the radio communication defining device is a base station, the radio defining signal that defines the special area is a distinctive base station identity signal comprising an identification code that identifies this base station, the checking data includes a set of at least one base station identification code.

FIG. 3 shows a geographical area 302 covered by a mobile telephone network of an operator, the radio coverage of the mobile telephone network in this geographical area 302 being the addition of the radio coverage 304 and 306 of several base stations 305 and 307. The mobile telephone network includes a server according to the invention comprising special operating means.

Any mobile station 300 whose presence in the special area is monitored includes observing means and processing means for observing and processing the base station identity signal of the mobile telephone network base stations 305 and 307.

The checking data is stored into an internal mobile station database included in a memory (storing means) of a mobile station 300 associated to this special area.

Processing means of the mobile station 300 process the base stations identity signals received and compare their base station identification codes to the checking data and determine that at least one distinctive base station identification code signal is received (i.e. the mobile station 300 is in position (a)) when any of the base station identification codes received is equal to at least one of the base 17 station identification codes stored into the internal mobile station database and otherwise determine that it is not receiving any distinctive base station identification code signal (i.e. the mobile station 300 is in position (b)).

For example, when a GSM mobile station is operating into a GSM mobile telephone network, the GSM mobile station 300 receives the identification code of the active base station and also the identification codes of some available neighbours base stations. The GSM mobile station 300 may consequently process the base station identification codes received to determine, together with the checking data, whether or not it is receiving any distinctive base station identification code signal.

The sum of the coverages 304 of the base stations 305 transmitting distinctive base station identification code signals defines a special area for the mobile station 300 according to the invention.

In this embodiment, an operator of a mobile telephone network covering a geographical area 302 may offer special services to the user of a mobile station 300 if he uses his/her mobile station 300 within the range of coverage of the base stations 305.

As an example a mobile telephone network operator can use this embodiment of the invention to offer one set of normal billing rates in an urban environment of a country, and another set of special billing rates for a rural environment. Another example of the application of this embodiment of the invention is for a mobile telephone network operator to offer normal billing rates for the whole country except in industrial areas or small towns.

Any combination of the embodiments of a mobile system according to the invention described herein is another embodiment here below of a mobile system according to the invention. That combination can be the result from 'N' different distinctive defining signals, each one comprising a different special mobile telephone network identification code or a different wireless device identification data or a different base station identification code.

For example, the mobile telephone network operator can then propose 'N' different sets of rates for 'N' different kinds of special areas for a given mobile station. In an example, an operator installs in the user's house a wireless device whose position is controlled by being or not in the range of coverage of a particular base station of the mobile network, another wireless device whose-• position is controlled by its connection to a fix network in the user's holiday cottage and a third wireless device whose position is controlled by its connection to a system embedded in the user's car. The operator creates a special mobile telephone network identification code transmitted by the all the base stations of the user's city. Then the operator stores in the storing means of the user's mobile station the three wireless devices identification data, the user's city special mobile telephone network identification code and several sets of base stations identification codes, each set being the set of identification of base stations covering public places like airports and train stations. Then, the operator can adapt the tariffs charged and the services provided to the user depending notably whether his/her mobile station is in its city or outside, in its house, holiday cottage or car and/or in public places.

Figure 4:
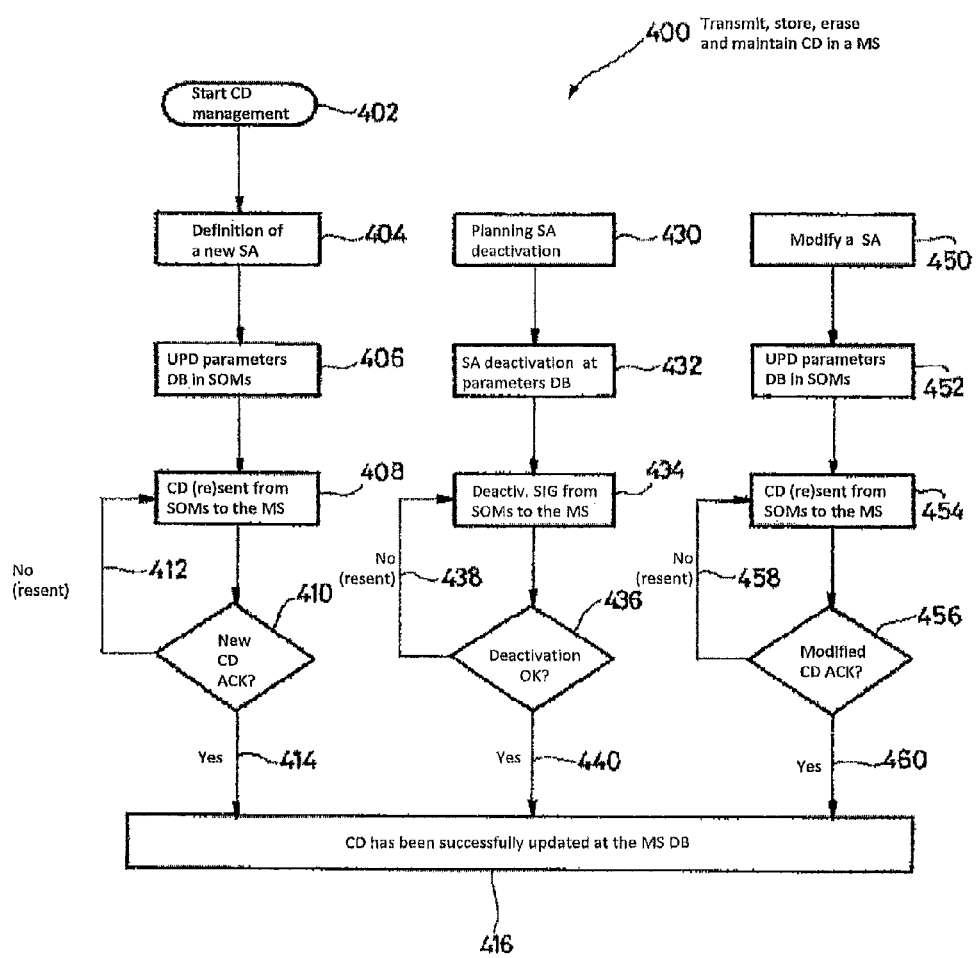
FIG. 4 is a flow chart illustrating partly an embodiment of a method according to the invention.
Figure 5:
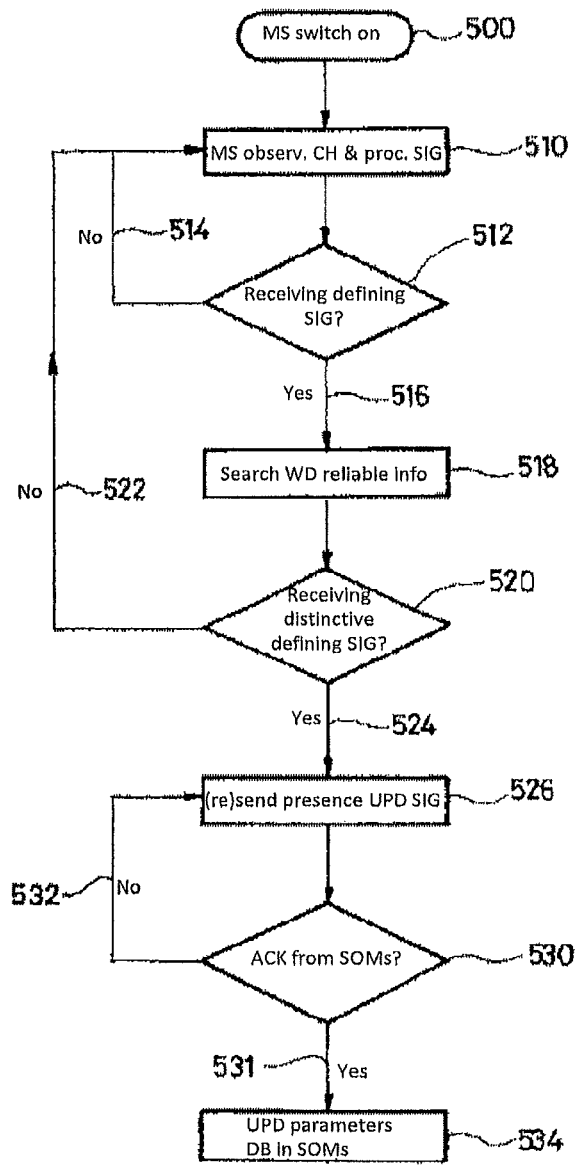
FIG. 5 is a flow chart illustrating another part of an embodiment of a method according to the invention.
Figure 6:
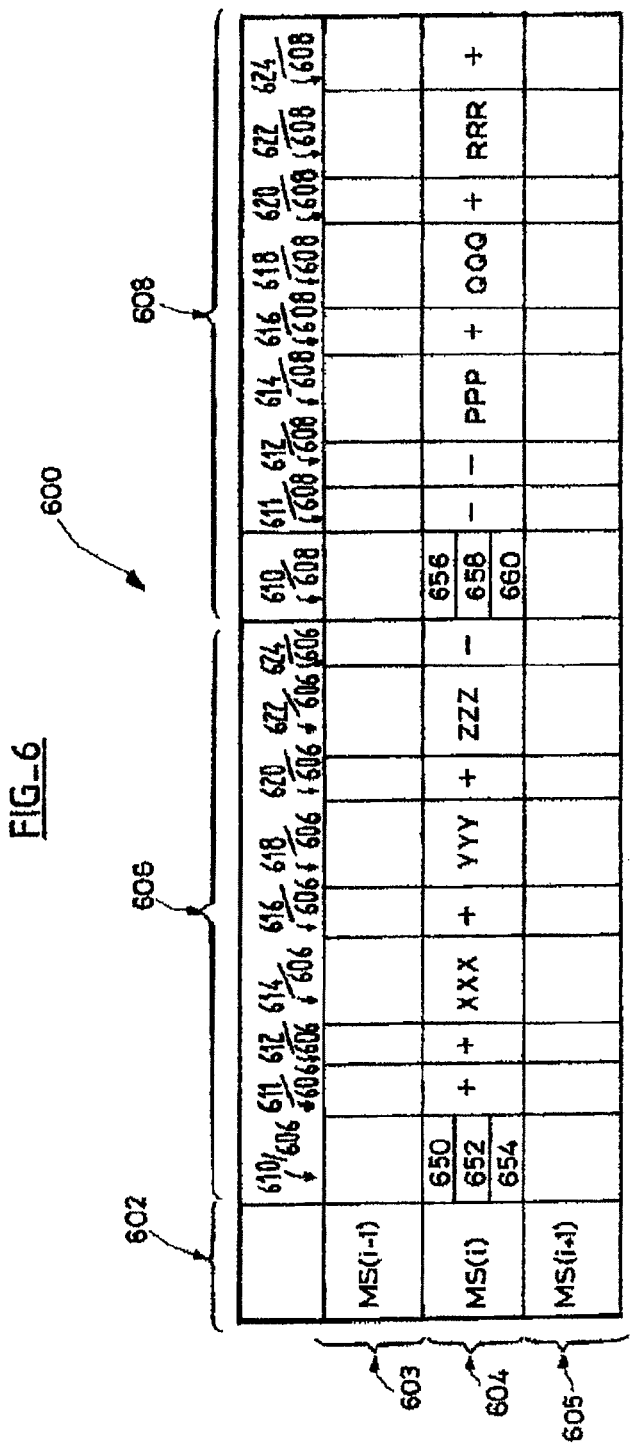
FIG. 6 is a schematic diagram of a part of an operating parameters database in an embodiment of the invention.

An embodiment of a method for monitoring the presence of a mobile station in at least one special area according to the invention may include at least three parts:

a first part, illustrated in FIG. 4, that includes the steps needed to successfully transmit, store, erase and maintain checking data in a mobile station according to the invention, a second part, illustrated in FIG. 5, that includes the steps needed for the mobile station to monitor its location in the special areas using the checking data that were transmitted to it and a third part, illustrated in FIGS. 6 and 7, that includes the adaptation of the operational parameters depending on the presence of the mobile station in any special area where this mobile station is monitoring its presence.

This embodiment of such method according to the invention may be carried out for example using any of the embodiments of mobile systems according to the invention described before.

FIG. 4 is a flowchart of the first part 400 of a method according to one embodiment of the invention for successfully transmit, store, erase and maintain checking data in a mobile station according to the invention.

A mobile telephone network comprises in this embodiment data processing means that includes special operating means; the special operating means are included in a server and therefore are advantageously centralised and not distributed between each base station of the mobile telephone network.

An operator of a mobile telephone network (i.e. the company that operates this mobile telephone network) wishes to propose special billing rates and/or special services to users of its mobile telephone network, each user carrying a mobile station, when said users are within special areas of the invention.

The part 400 of this embodiment starts in step 402 when the operator wishes to monitor the presence of a mobile station in a special area.

In step 404, the operator defines a new special area if the operator wishes to create a new one. The special areas may be agreed between the operator and the user or simply defined by the operator.

The definition of the special area can be done by the coverage of one or several radio defining signals or by the intersection of the coverage of two or more radio defining signals.

In step 406, the operator updates a parameters database included in the special operating means. The parameters database associates each special area defined with the mobile stations whose presence in such special area is monitored. For the purposes of such association, each mobile station is identified into the parameters database by means of a mobile station identifier. In the parameters database, each mobile station identifier is associated with special tariffs and/or services which may be or not available for the mobile station depending on the presence of such mobile station into a given special area (and also depending on whether such tariffs and/or services are enabled or disabled into the parameters database for such mobile station).

The operating parameter(s) that may be adapted depending on the presence of the mobile station in one or more special areas at the same time may be notably related to activation or deactivation flags of tariffs and/or services provided to the mobile station by the mobile telephone network. Therefore, tariffs may be more or less expensive for the said mobile station in predetermined special areas and/or the mobile station may be able or unable to use predetermined services offered by the operator of the mobile telephone network in predetermined special areas.

In step 408, the special operating means send a checking data to the mobile 15 station.

The checking data transmission can notably be done:
1) by sending the checking data stored in a server of the mobile telephone network to the mobile station through the mobile telephone network transmission channels. In a particular example, the mobile telephone network is a GSM network and the checking data from the server will be sent to the mobile station via encrypted short messages using an 'Over the Air' platform. The mobile station is able to decode the short messages and to store the checking data into an internal mobile station database,
2) through the use of a mobile station special software able to store into an internal mobile station database checking data obtained by the mobile station from at least one radio communication defining device. In a particular example, it may be necessary that an operator's representative introduces a password to allow the mobile station special software to operate. The mobile station special software may ask the operator's representative to validate the storage of the checking data through the mobile telephone keyboard,
3) or via a person (e.g. an operator's representative) who enters the checking data into the mobile station using the mobile station keyboard.

Regarding the second option, two examples are provided. In a first example, the mobile station is operating in a GSM network, the mobile station obtains from the active cell its cell identification code and from other neighbouring cells, if available, their cell identification codes. When the special software is run for example in the user's home, it is able to obtain such cells identification codes and store them in the internal mobile station database of checking data, associating them with the user's home special area.

In a second example, the mobile station can obtain, by using a WIFI device embedded into the mobile station, neighbouring WIFI devices identification data. When the special software is run for example in the user's home, it is able to obtain such WIFI device identification data and store them in the internal mobile station database of checking data, associating them with the user's home special area.

Once the checking data has been successfully stored into the internal mobile station database, a confirmation of new checking data is sent to the parameters database. In addition, notably regarding to the second and third options to transmit checking data to the mobile station, the stored checking data may be sent by the mobile station to the parameters database through the mobile telephone network for the mobile telephone network to know this checking data.

In step 410, the special operating means wait for the confirmation of new checking data from the mobile station. Once the information is received, it is stored into the parameters database and the special operating means transmit an acknowledgment to the mobile station. In case the mobile station does not receive the acknowledgment after a certain time, the mobile station sends the confirmation of new checking data again until it receives the acknowledgment or until it resents the information up to a maximum number of times.

It is advantageous to store the checking data into the mobile station, mainly in comparison to the prior art where it was necessary to store mobile station identity codes and/or activation signals into a fix unit.

If the confirmation of new checking data is not received (possibility 412) by the special operating means, the special operating means transmit again the checking data to the mobile station (step 408).

When the confirmation of new checking data from the mobile station is received (possibility 414) by the special operating means, the special operating means know in step 416 that the mobile station updated its internal mobile station database and the internal mobile station database is in accordance with the operator wishes.

After the first special area checking data or set of checking data is stored in the internal mobile station database, the operator can add more in the same way.

In another hand, in this embodiment of a method according to the invention, the operator can deactivate a special area following the steps 430 to 440.

In step 430, the operator chooses to deactivate a special area for a mobile station, with or without the agreement of the mobile station user. In step 432, the operator deactivates into the parameters database all the special tariffs and/or services associated to the presence of the mobile station into the special area. In step 434, the special operating means transmit a deactivation signal to the mobile station (using the mobile telephone network) asking the mobile station to erase, into its internal mobile station database, the checking data associated with the special area that the operator wishes to deactivate.

In another embodiment, the deactivation signal just blocks into the mobile station the use of the special area checking data but does not erase it. The result is the same: the deactivation signal avoids the mobile station recognising the special area(s) associated with this deactivation signal.

The transmission of the deactivation signal may be done notably as in the first and third options for transmitting the checking data (as seen in description of step 408).

Once the deactivation signal has been successfully received and processed by the mobile station, a confirmation of deactivation is sent to the parameters database. In step 436, the special operating means wait for the confirmation of deactivation from the mobile station. Once the confirmation of deactivation is received by the special operating means (possibility 440), this fact is stored into the parameters database and the special operating means transmit an acknowledgment to the mobile station. In case the mobile station does not receive the acknowledgment after a certain time, the mobile station sends the confirmation of deactivation again until it receives the acknowledgment or, in another embodiment, until it resents the confirmation of deactivation up to a maximum number of times.

If the confirmation of deactivation is not received (possibility 438) by the special operating means, the special operating means transmit again a deactivation signal to the mobile station (step 434).

When the confirmation from the mobile station regarding the successful reception and process of the deactivation signal is received (possibility 440) by the operating means, the operating means know in step 416 that the mobile station updated its internal checking data database and the internal mobile station database is in accordance with the operator wishes.

In another hand, in this embodiment of a method according to the invention, the operator can modify a special area following the steps 450 to 460 to adapt the internal mobile station database to the operator's wishes. In step 450, the operator chooses to modify a special area for a given mobile station, with or without the agreement of the mobile station user, and defines such modified special area. For example, this can be done by including in the checking data associated to one special area, some additional checking data for the special area being not only the coverage of one distinctive defining signal but the intersection (or the sum) of the coverage of the former one and the coverage of a new one. This can be done too by erasing in a set of checking data associated to one special area, some checking data in order to, for example, transform a special area defined as the intersection (or the sum) of the coverage of two distinctive defining signals into a special area defined as the coverage of one only distinctive defining signal.

In case the operator wishes to add a new checking data (the steps for erasing one can be easily inferred by analogy), in step 452, the operator updates the parameters database in order to include, if known, the new checking data associated to the mobile station and the modified special area.

In step 454, the special operating means send, by using any of the three options for transmitting checking data described in step 408, the new checking data to the mobile station using the mobile telephone network.

Once the new checking data has been successfully stored into the part of the internal mobile station database that contains the checking data linked to the special area that has to be modified, a confirmation of modification of checking data is sent to the parameters database. In addition, typically regarding to the second and third options to transmit checking data to the mobile station described in step 408, the stored new checking data may be sent by the mobile station to the parameters database through the mobile telephone network. In step 456, the special operating means wait for the confirmation of modification of checking data from the mobile station. Once the confirmation of modification is received, this fact is stored into the parameters database and the special operating means transmit an acknowledgment to the mobile station. In case the mobile station does not receive the acknowledgment after a certain time, the mobile station sends the information again until it receives the acknowledgment or, in another embodiment, until it resents the information up to a maximum number of times.

If the confirmation of modification of checking data is not received (possibility 458) by the special operating means, the special operating means send again the new checking data to the mobile station (step 454).

When the confirmation of modification sent from the mobile station is received by the special operating means (possibility 460), the special operating means know that in step 416, the mobile station updated its internal checking data database and the internal mobile station database is in accordance with the operator wishes.

The second part of this embodiment of a method according to the invention is illustrated in FIG. 5 and includes the steps needed for the mobile station to monitor its location in the special areas using the checking data that were transmitted into it.

In step 500, a mobile station is switched on. In an embodiment, the mobile telephone network sets the values of the operating parameters managed in the parameters database to a set of initial values when the mobile station is switched off (as at that time it is not present in any special area) in order to start operating the mobile station when it is just switched on.

In step 510, the mobile station observes, through the appropriate channel(s), any signal received and process it to determine whether or not it is receiving any defining signal from. radio communication defining devices (e.g. from the base stations of a mobile telephone network or from wireless devices).

In one embodiment, the defining signal is coded (or part of the data contained in such a defining signal). In this embodiment, the mobile station is able to decode the information as part of the processing of the defining signals received.

A radio defining signal from a radio communication defining device may be transmitted on a continuous or periodical basis. The mobile station observation as to whether or not it is receiving any defining signal can be continuous or periodical. In step 512, the mobile station decide if it receives a defining signal (possibility 516) or not (possibility 514) after observing and processing any signal received.

When one or several defining signals are received, they are processed in step 518 by the mobile station notably in order to compare, in this embodiment, the appropriate part of their content with any checking data stored in the internal mobile station database.

When a defining signal received is from a wireless device (transmitted in a frequency range outside the frequency range allocated for the mobile telephone network), the mobile station preferably also search in step 518 whether or not the defining signal received contains reliable information confirming (or not) that the wireless device is effectively located into a predetermined environment defined by the operator of the mobile telephone network.

Then, in step 520, depending on the result of the internal process carried out in step 518, the mobile station decides whether (possibility 524) or not (possibility 522) the defining signal received is a distinctive defining signal that defines a special area for this mobile station, therefore validating or not the defining signal received as a distinctive defining signal.

If the special area is defined by the sum of the coverage of several distinctive defining signals, the mobile station has to recognize at least one of the three distinctive defining signals at one time in order to determine that it is into this special area.

In another example, the mobile station knows that it is into a special area defined as the intersection of the coverage of several distinctive defining signals when it is observing and recognizing at one time all these distinctive defining signals.

The mobile station may be prepared to display a text or an icon (e.g. 'home' or airport' icon) when the mobile station determines that it is included in a particular special area for this mobile station.

In step 526, the mobile station sends and updating signal to the mobile telephone network about its presence in the special area.

In particular embodiment, the mobile station sends periodically (for example every 30 seconds) an updating signal about its presence into a special area, such updating signal comprising the result of the last determination performed by the mobile station about its presence into the special area.

In another particular embodiment the mobile station only sends to the mobile telephone network an updating signal about its presence into a special area when
it enters into or exit from such special area.

For a special area defined by the sum of the coverage of several distinctive defining signals:

If the mobile station processing of the defining signals received in a certain moment determines that at least one distinctive defining signal associated to this special area is received:

If the previous processing of the defining signals received determined that no distinctive defining signal associated to this special area was received at that time then the mobile station interprets that it has recently entered into this special area.

If the next processing of the defining signals received determines that at least one distinctive defining signal associated to this special area is still being received then the mobile station interprets that it remains located into this special area;

If the mobile station processing of the defining signals received in a certain moment determines that no distinctive defining signal associated to this special area is received:

If the previous processing of the defining signals received determined that at least one distinctive defining signal associated to this special area was received at that time then the mobile station interprets that it has recently left this special area.

If the next processing of the defining signals received determines that no distinctive defining signal associated to this special area is still being received then the mobile station interprets that it remains out of this special area.

For a special area defined by the intersection of the coverage of several distinctive defining signals a procedure equivalent to the one above can be easily inferred by analogy.

The updating signal may be sent through a diversity of channels provided by the mobile telephone network. For example, in a GSM mobile network, the updating signals can be sent using the USSD ('Unstructured Supplementary Service Data', GSM standards) channel. The data comprised into the updating signal will typically be coded by the mobile station and decoded by the special operating means of the server.

In this embodiment, the updating signals are sent from the mobile station to the special operating means of the mobile telephone network requesting an acknowledgement from the special operating means.

In step 530, the mobile station search for the acknowledgment from the special operating means.

If the acknowledgement is not received in the mobile station (possibility 532) because the updating signal does not reach the special operating means or the mobile station detects a failure in the transmission of the updating signal or there is a failure in the transmission of the acknowledgment, then the mobile station may send the updating signal again up to a predetermined number of times according to a predefined retransmissions policy.

When the acknowledgment is received (possibility 531) into the mobile station, the mobile station knows in step 534 that the special operating means will make the appropriate adaptations in the operating parameters of the special areas database.

More generally, the special operating means area waiting for any updating signal from any mobile station whose identification code is into the parameters database. When the special operating means receive an updating signal from a mobile station, they then adapt the operational parameters of the special areas database that depend on the presence of this mobile station m a special area associated with this mobile station and send the acknowledgement.

In one embodiment, the updating signal contains a request to access to services and/or to download contents provided direct or indirectly by the mobile telephone network of the operator. Then, an access or downloading right is granted or denied by the mobile telephone network depending on the presence of the mobile station in a special area.

The acknowledgment signals of the updating signal from the special operating means are preferably coded. In that case, the mobile station processing means are able to decode the acknowledgments of the updating signals.

The operator of the mobile telephone network has therefore a guarantee that the mobile telephone network will know at least a change on the presence of the mobile station in one or more special areas even if the radio communication link between the mobile station and the mobile telephone network is temporarily unavailable.

In a particular embodiment the mobile telephone network may enable or disable to the mobile station to use predetermined services depending on the presence of the mobile station into a special area.

As an example, the mobile station may incorporate special checking software able to generate statistics about the use of the mobile telephone (phone calls, messages, etc.) into special areas. This software may be enabled for operation by the mobile telephone network when the mobile station enters into a predetermined special area and disabled when the mobile station exits such special area.

As another example, the mobile telephone network may broadcast certain messages associated to a special area (e.g. airport information). The mobile station can be enabled by the mobile telephone network to accept and display those broadcasted messages when it is located within this special area and disabled when it exits the special area.

The third part of this embodiment of a method according to the invention is illustrated in FIGS. 6 and 7 and includes the adaptation of the operational parameters to the presence of the mobile station in any special area where this mobile station is monitoring its presence.

When the mobile telephone network receives an updating signal, the special operating means of the server adjust the value of at least one operating parameter of a parameters database linking the special area and the mobile station. The value of the operating parameter(s) depends on the information contained into the updating signal about the presence of the mobile station into the special area.

In a particular example, operating parameters related to a special tariff and some services are enabled or remains enabled into the referred parameters database when the information contained into the updating signal indicates that the mobile station has recently entered or remains located into the special area. In the same example, the special tariff and the services are disabled or remains disabled into the referred parameters database when the information contained into the updating signal indicates that the mobile station recently left or remains out of the special area.

More precisely, FIG. 6 is a schematic illustration of an example of a part of the parameters database 600 of operating parameters included in the special operating means according to an embodiment of the invention. The illustrated part of the special operating means database 600 links two special areas SA1 606 and SA2 608 with 3 mobile stations identification codes MS(i−1), MS(i) and MS(I+1), each of which having an entry 603, 604 and 605.

The column 602 of the database comprises the mobile stations identification codes. A mobile station identification code refers to a code that is associated with the subscription of the mobile station user into the mobile telephone network. As an example, in a GSM network the referred mobile station identification code may be the MSISDN.

In this example, the set of checking data of mobile "station MS(i) for the special area SA1 606, defined in the column 610/606 of the entry 604 contains:

- a checking data 650 comprised into the distinctive defining signal of a first base station BS1 (e.g. the identification code of BS1), such distinctive defining signal defines the special area SA1 606,
- a checking data 652 comprised into the distinctive defining signal of a second base station BS2 (e.g. the identification code of BS1), such distinctive defining signal also defines the special area SA1 606, and a checking data 654 comprised into the distinctive defining signal of a wireless device WD1 (e.g. the identification data of WD1), such distinctive defining signal also defines the special area SA1 606, for the special area SA1. The mobile station determines that it is located into the special area SA1 606 when it receives at least one of the three identifiers 650, 652, 654 comprised into the distinctive defining signals coming from BS1, BS2 and WD1, i.e. when it is located within the range of coverage of any of the three distinctive defining signals (according to one of the embodiments of the invention, in the case of the defining signal of WD1, in order to consider that such defining signal is a distinctive defining signal, it will additionally be necessary that the reliable information comprised into the defining signal confirms that WD1 is effectively located into a predetermined environment).

In this example, the value of column 611/606 for the mobile station MS(i) and for the special area 606 is enabled ('−i−') or disabled ('−') at a given time depending on whether or not the mobile telephone network receives a confirmation of new checking data (see description of FIG. 4) from this mobile station confirming that all the checking data corresponding with the special area has been stored into this mobile station (based on the same principle, it would also be possible to add another column in the parameters database to monitor the reception of confirmations of deactivation of checking data and another one to monitor the reception of confirmations of modification of checking data for a given special area 32: see description of FIG. 4).

In this example, the value of column 611/606 for MS(i) is enabled (+) for the special area SA1 606. In another example, the value of column 611/606 for the mobile station MS (i) and for the special area 606 contains a set of values enabled ('+) or disabled ('−'), one for each checking data.

The column 612/606 corresponding to the operating parameter "Mobile Station Control Flag" is enabled ('+') or disabled ('−') at a given time for the mobile station MS (i) and for the special area SA1 606 depending on the information comprised into the updating signals received about the presence of the mobile station into the special area 606. In this example, at a given time, the mobile station MS(i) is supposed to be in SA1 606 as the operating parameter "Mobile Station Control Flag" 612/606 is enabled (+1).

When the "Mobile Station Control Flag" is enabled (+) at a given time for the mobile station MS(i) and for the special area 606, certain tariffs or services related to such special area may be available for the user of the mobile station depending on the value (+) or (−) of the corresponding tariff or service flags for such mobile station and special area into the operating parameters database. In this example, at a given time, in the column 'Tariff identifier' 614/606, the parameter is then set at 'XXX' and in the column 616/606, the 'Tariff Flag' is enabled (+). In the column 618/606, the 'Service identifier' parameter is then set at 'YYY' and in the column 620/606, the 'Service Flag' of said service 'YYY' is enabled ('+'). In the column 622/606, the 'Service identifier' parameter—is set at 2ZZ' and in the column 624/606, the 'Service Flag' of said service 'ZZZ' is disabled ('−') because service ZZZ is disabled at that time for the mobile station MS(i) and the special area SA1 606.

The set of columns 610/608 to 624/608 provides the same kind of information for the special area SA2 608. The set of checking data of mobile station MS(i) (column 610/608) refers to wireless devices WD1 with the checking data 656, WD2 with the checking data 658 and WD3 with the checking data 660 for the special area SA2 608. In this special area, at that time, the value of column 611/608 for MS(i) is disabled (−), the operating parameter "Mobile Station Control Flag" (column 612/608) is disabled ('−'). Tariff 'PPP' (column 614/608) is enabled ('+' in column 616/608), service 'QQQ' (column 6) 8/608) is enabled ('+' in column 620/608) and service 'RRR' (column 622/608) is enabled ('+' in column 624/608). The tariff PPP and the services QQQ and RRR are associated to mobile station MS(i) when it is in' the special area SA2 608.

In another embodiment of the invention, the special operating means are distributed into different servers of the mobile telephone network or of service providers associated with the mobile telephone network and an updating signal may be sent to any of those servers.

In a particular example of this embodiment, there will be a server containing a part of the special operating means that stores a parameters database (e.g. the database illustrated in FIG. 6) of operating parameters containing the special areas checking data. In this example part of the updating signals from the mobile stations may be sent to this server of the mobile telephone network and processed by the part of the special operating means that this server contains.

In this example there will be at least another server, called switch server, into the mobile telephone network or associated to it, server that is including another part of the special operating means that include another parameters database of operating parameters, called switch parameters database, that does not contain checking data. The part of special operating means included in this other server allows or forbids the provision of some multimedia contents and applications available to mobile stations (and may preferably provide them itself) depending on the presence, in any special area registered in this switch parameters database, of any mobile station associated with this special area in this switch parameters database.

FIG. 7 illustrates an example of part of a switch parameters database 700 where 702, 703, 704, 705, 706, 708, 712/706 and 712/708 have the same meaning than respectively 602, 603, 604, 605, 606, 608, 612/606 and 612/608 of FIG. 6. The contents and applications 'AAA' are available to the mobile station MS(i) when it is into the special area SA1 706. The contents and applications 'BBB' are available to the mobile station MS(i) when it is into the special area SA2 708.

In the example of FIG. 7, the part of the special operating means included into the switch server receives, embedded into an updating signal from MS(i), a request to download a content or an application 'AAA', and the downloading right is granted because such updating signal from MS(i) also indicates (value '+' in column 712/706) that it is located in the special area 706 at that time.

In the same manner, in the example of FIG. 7, the part of the special operating means included into the switch server receives, embedded into an updating signal from MS(i), a request to download a content or an application 'BBB', but the downloading right is not granted because such updating signal from MS(i) also indicates (value in column 712/708) that it is not located in the special area 708 at that time.

In some cases the switch server is entirely property of the mobile telephone network operator while in some others there is an agreement in place with a third party.

Although the present invention has been described in detail for purpose of illustration, it is understood that such detail is solely for that purpose, and variations can be made therein by those skilled in the art without departing from the scope of the invention. Thus, while the preferred embodiments of the method and of the mobile system have been described in reference to the environment in which they were developed, they are merely illustrative of the principles of the invention. Other embodiments and configurations may be devised without departing from the scope of the appended claims.

Further, although the embodiments of the invention describe with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program. For example, the carrier may comprise storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of the relevant processes.

The invention claimed is:

1. A method associated with the use of a mobile station and at least first and second radio communication defining devices that respectively transmit first and second distinctive defining signals that at least partly define a special area by a sum or intersection of their coverage, the first and second distinctive defining signals respectively including first and second data, the method comprising:
   determining in the mobile station if the mobile station is receiving one or both of the first and second distinctive defining signals and determining in the mobile station, based on a previously obtained at least portion of one or both of the first and second data, whether or not the mobile station is present in the special area; and
   sending from the mobile station via a mobile telephone network an updating signal to one or more servers of a provider of presence related services about the mobile station's presence in the special area, the sending of the updating signal being uncorrelated to any mobile station phone call establishment, the updating signal being sent at least one of (i) periodically, (ii) at times recent to when the mobile station enters into or exists from the special area, and (iii) when the mobile station remains in the special area.

2. The method according to claim 1, wherein the updating signal comprises the result of a previous determination performed by the mobile station about the mobile station's presence in the special area.

3. The method according to claim 1, wherein the frequency of the updating signal is different from the frequency of the distinctive defining signal.

4. The method according to claim 1, wherein the mobile station enables or disables one or more functions related to a presence related service upon receiving enabling or disabling instructions from the provider of presence related services.

5. A non-transitory computer readable medium storing computer readable program code for causing a processor of a mobile station to perform a method associated with the use of at least first and second radio communication defining devices that respectively transmit first and second distinctive defining signals that at least partly define a special area by a sum or intersection of their coverage, the first and second distinctive defining signals respectively including first and second data, the method comprising:

determining in the mobile station if the mobile station is receiving one or both of the first and second distinctive defining signals and determining in the mobile station, based on a previously obtained at least portion of one or both of the first and second data, whether or not the mobile station is present in the special area; and sending from the mobile station via a mobile telephone network an updating signal to one or more servers of a provider of presence related services about the mobile station's presence in the special area, the sending of the updating signal being uncorrelated to any mobile station phone call establishment, the updating signal being sent at least one of (i) periodically, (ii) at times recent to when the mobile station enters into or exists from the special area, and (iii) when the mobile station remains in the special area.

6. The non-transitory computer readable medium storing computer readable program code according to claim 5 that further causes the processor to enable or disable one or more functions in the mobile station related to a presence related service upon the mobile station receiving enabling or disabling instructions from the provider of presence related services.

7. A mobile station capable of receiving first and second distinctive defining signals respectively from first and second radio communication defining devices, the first and second distinctive defining signals at least partly defining a special area by a sum or intersection of their coverage, the first and second distinctive defining signals respectively including first and second data, the mobile station comprising:

an electronic storage medium that stores at least a portion of the first and second data; and a processor adapted to process the first and second distinctive defining signals to determine, based on at least portion of one or both of the first and second data, whether or not the mobile station is present in the special area, the processor further adapted to send from the mobile station via a mobile telephone network an updating signal to one or more servers of a provider of presence related services about the mobile station's presence in the special area, the sending of the updating signal being uncorrelated to any mobile station phone call establishment, the updating signal being sent at least one of (i) periodically, (ii) at times recent to when the mobile station enters into or exists from the special area, and (iii) when the mobile station remains in the special area.

8. The mobile station according to claim 7, wherein the processor is adapted to enable or disable one or more functions related to a presence related service upon the mobile station receiving enabling or disabling instructions from the provider of presence related services.

9. A method associated with a mobile station receiving first and second distinctive defining signals respectively from first and second radio communication defining devices, the first and second distinctive defining signals at least partly define first and second special areas, respectively, by their coverage, each of the first and second distinctive defining signals respectively including first and second data, the method comprising:

receiving and processing one or more defining signals in the mobile station to determine, based on a previously obtained at least portion of the first data, whether the one or more defining signals are one or more first distinctive defining signals and to determine whether or not the mobile station is present in the first special area, receiving and processing one or more defining signals in the mobile station to determine, based on a previously obtained at least portion of the second data, whether the one or more defining signals are one or more second distinctive defining signals and to determine whether or not the mobile station is present in the second special area, sending from the mobile station via a mobile telephone network, when the mobile station determination refers to the first special area, a first updating signal to one or more servers of a first provider of presence related services about the mobile station's presence in the first special area, the sending of the first updating signal being uncorrelated to any mobile station phone call establishment, the updating signal being sent at least one of (i) periodically, (ii) at times recent to when the mobile station enters into or exists from the first special area, and (iii) when the mobile station remains in the first special area; and sending from the mobile station via a mobile telephone network, when the mobile station determination refers to the second special area, a second updating signal to one or more servers of a second provider of presence related services, different than the first provider of presence related services, about the mobile station's presence in the second special area, the sending of the updating signal being uncorrelated to any mobile station phone call establishment, the second updating signal being sent at least one of (i) periodically, (ii) at times recent to when the mobile station enters into or exists from the second special area, and (iii) when the mobile station remains in the second special area.

10. The method according to claim 9, wherein the first updating signal is sent with information related to the result of a previous determination performed by the mobile station about the mobile station's presence in the first special area.

11. The method according to claim 9, wherein the second updating signal is sent with information related to the result of a previous determination performed by the mobile station about the mobile station's presence in the second special area.

12. A non-transitory computer readable medium storing computer readable program code for causing a processor of a mobile station to perform a method associated with the mobile station receiving first and second distinctive defining signals that at least partly define first and second special areas, respectively, by their coverage, each of the first and second distinctive defining signal respectively including first and second data, the method comprising:

receiving and processing one or more defining signals in the mobile station to determine, based on a previously obtained at least portion of the first data, whether the one or more defining signals are one or more first distinctive defining signals and to determine whether or not the mobile station is present in the first special area, receiving and processing one or more defining signals in the mobile station to determine, based on a previously obtained at least portion of the second data, whether the one or more defining signals are one or more second distinctive defining signals and to determine whether or not the mobile station is present in the second special area, sending from the mobile station via a mobile telephone network, when the mobile station determination refers to the first special area, a first updating signal to one or more servers of a first provider of presence related services about the mobile station's presence in the first special area, the sending of the first updating signal being uncorrelated to any mobile station phone call establishment, the updating signal being sent at least one of (i) periodically, (ii) at times recent to when the mobile station enters into or exists from the first special area, and (iii) when the mobile station remains in the first special area; and sending from the mobile station via a mobile telephone network, when the mobile station determination refers to the second special area, a second updating signal to one or more servers of a second provider of presence related services, different than the first provider of presence related services, about the mobile station's presence in the second special area, the sending of the updating signal being uncorrelated to any mobile station phone call establishment, the second updating signal being sent at least one of (i) periodically, (ii) at times recent to when the mobile station enters into or exists from the second special area, and (iii) when the mobile station remains in the second special area.

13. The non-transitory computer readable medium storing computer readable program code according to claim 12 that further causes the processor to send the first updating signal with information related to the result of a previous determination performed by the mobile station about the mobile station's presence in the first special area.

14. The non-transitory computer readable medium storing computer readable program code according to claim 12 that further causes the processor to send the second updating signal with information related to the result of a previous determination performed by the mobile station about the mobile station's presence in the second special area.

* * * * *